(12) United States Patent
Mu

(10) Patent No.: US 12,621,868 B2
(45) Date of Patent: May 5, 2026

(54) RANDOM ACCESS RESPONSE SENDING METHOD AND RECEIVING METHOD, AND APPARATUS AND TERMINAL DEVICE

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 468 days.

(21) Appl. No.: 18/254,398

(22) PCT Filed: Nov. 30, 2020

(86) PCT No.: PCT/CN2020/132774
§ 371 (c)(1),
(2) Date: May 25, 2023

(87) PCT Pub. No.: WO2022/110143
PCT Pub. Date: Jun. 2, 2022

(65) Prior Publication Data
US 2024/0107586 A1 Mar. 28, 2024

(51) Int. Cl.
*H04W 74/0833* (2024.01)
*H04W 74/00* (2009.01)
(52) U.S. Cl.
CPC ..... *H04W 74/0833* (2013.01); *H04W 74/006* (2013.01)
(58) Field of Classification Search
None
See application file for complete search history.

(56) References Cited

U.S. PATENT DOCUMENTS

| | | | |
|---|---|---|---|
| 2014/0050186 A1* | 2/2014 | Kim | H04L 5/0078 370/329 |
| 2015/0229366 A1* | 8/2015 | Hesse | H04B 7/0413 375/267 |
| 2019/0364605 A1* | 11/2019 | Loehr | H04W 28/0278 |
| 2020/0053757 A1* | 2/2020 | Bagheri | H04L 5/0053 |
| 2020/0107373 A1* | 4/2020 | Roy | H04L 5/001 |
| 2021/0251013 A1* | 8/2021 | Turtinen | H04W 74/0833 |

(Continued)

FOREIGN PATENT DOCUMENTS

| | | |
|---|---|---|
| CN | 105230107 A | 1/2016 |
| CN | 105430750 A | 3/2016 |

(Continued)

OTHER PUBLICATIONS

Combined Chinese Office Action and Search Report issued Nov. 13, 2024 in Chinese Patent Application No. 202060003414.3 (with English translation), 18 pages.

(Continued)

*Primary Examiner* — Faiyazkhan Ghafoerkhan
(74) *Attorney, Agent, or Firm* — Oblon, McClelland, Maier & Neustadt, L.L.P.

(57) ABSTRACT
A method for sending a random access response, where the method is applied to a base station, and the method includes: generating at least one random access response (RAR) in response to receiving at least one random access preamble; and allocating the at least one RAR to at least one transport block carried by at least one physical downlink shared channel (PDSCH).

19 Claims, 5 Drawing Sheets

Receiving at least one random access preamble ⟋ 501

Generating at least one random access response (RAR) in response to the received at least one random access preamble ⟋ 502

Allocating the at least one RAR to at least one transport block carried by a PDSCH according to a preset algorithm ⟋ 503

(56)  References Cited

U.S. PATENT DOCUMENTS

| | | | | |
|---|---|---|---|---|
| 2021/0392696 | A1* | 12/2021 | Loehr | H04W 28/0278 |
| 2022/0124822 | A1* | 4/2022 | Taherzadeh Boroujeni | H04L 1/189 |
| 2022/0418007 | A1* | 12/2022 | Hou | H04W 74/0833 |
| 2023/0328752 | A1* | 10/2023 | Nimbalker | H04L 5/0053 370/329 |
| 2024/0107586 | A1* | 3/2024 | Mu | H04W 74/0833 |
| 2024/0298354 | A1* | 9/2024 | Turtinen | H04W 74/0833 |
| 2025/0016843 | A1* | 1/2025 | Turtinen | H04W 74/0833 |

FOREIGN PATENT DOCUMENTS

| | | |
|---|---|---|
| CN | 107432037 A | 12/2017 |
| CN | 107534977 A | 1/2018 |
| CN | 109617656 A | 4/2019 |
| CN | 110366261 A | 10/2019 |
| CN | 110495192 A | 11/2019 |

OTHER PUBLICATIONS

International Search Report issued Sep. 1, 2021 in PCT/CN2020/132774, filed on Nov. 30, 2020, 6 pages (with English Translation). "RAR and Paging transmission for Rel-13 MTC" (R1-152676), NEC, 3GPP TSG RAN WG1 Meeting #81, May 25-29, 2015, pp. 1-5.

* cited by examiner

| Receiving at least one random access preamble | 501 |

| Generating at least one random access response (RAR) in response to the received at least one random access preamble | 502 |

| Allocating the at least one RAR to at least one transport block carried by a PDSCH according to a preset algorithm | 503 |

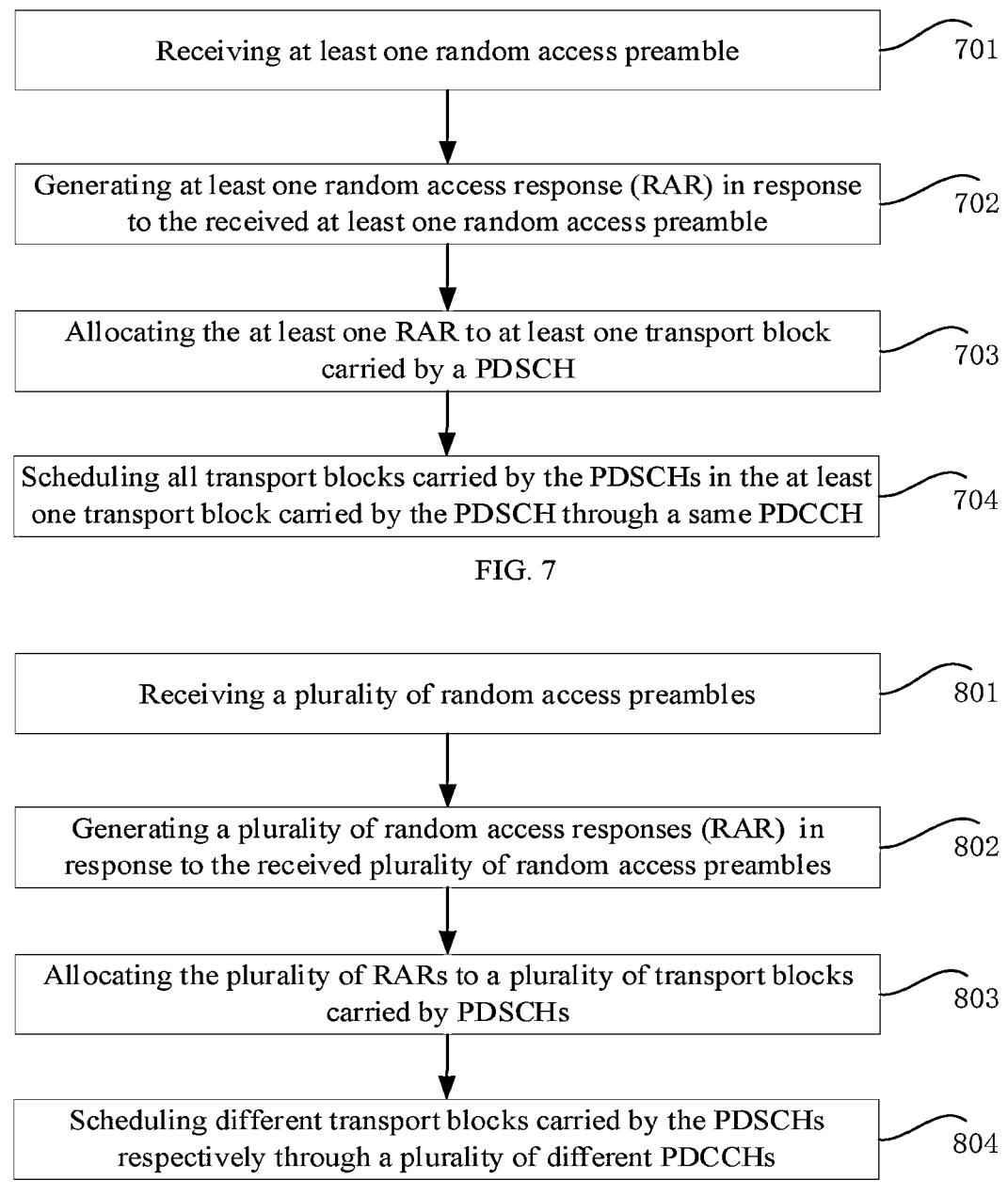

Receiving at least one random access preamble — 701

Generating at least one random access response (RAR) in response to the received at least one random access preamble — 702

Allocating the at least one RAR to at least one transport block carried by a PDSCH — 703

Scheduling all transport blocks carried by the PDSCHs in the at least one transport block carried by the PDSCH through a same PDCCH — 704

FIG. 7

Receiving a plurality of random access preambles — 801

Generating a plurality of random access responses (RAR) in response to the received plurality of random access preambles — 802

Allocating the plurality of RARs to a plurality of transport blocks carried by PDSCHs — 803

Scheduling different transport blocks carried by the PDSCHs respectively through a plurality of different PDCCHs — 804

FIG. 8

RANDOM ACCESS RESPONSE SENDING METHOD AND RECEIVING METHOD, AND APPARATUS AND TERMINAL DEVICE

CROSS-REFERENCE TO RELATED APPLICATIONS

The present application is a U.S. National Stage of International Application No. PCT/CN2020/132774, filed on Nov. 30, 2020, all contents of which are incorporated herein by reference in their entireties for all purposes.

TECHNICAL FIELD

The present disclosure relates to the technical field of mobile communications, and in particular, to a method for sending a random access response, a method for receiving a random access response, an apparatus for sending a random access response, an apparatus for receiving a random access response, a base station, a terminal device, and a storage medium.

BACKGROUND

With the continuous development of Internet of Things services, for example, popularization of services such as video monitoring, smart home, wearable devices, industrial sensing monitoring and the like, these services generally have relatively higher requirements for rate, for example, requirements of rates of dozens to a hundred of megabytes, while also having relatively higher requirements for time delay. Therefore, it is difficult for the MTC (Machine Type Communication) technology and NB-IoT (Narrow Band Internet of Things) technology in LTE (Long Term Evolution) to meet these requirements. Based on this situation, many companies propose designing a new user equipment (UE) in the 5G (5th Generation Mobile Networks) new air interface to cover the requirements of such a terminal Internet of Things device. In the current 3GPP (3rd Generation Partnership Project) standardization, this new terminal type is called as Reduced Capability (Reducap) UE or simply called as NR-Lite.

SUMMARY

Embodiments of the first aspect of the present disclosure provide a method for sending a random access response, the method is applied to a base station, and the method includes: generating at least one random access response (RAR) in response to receiving at least one random access preamble; and allocating the at least one RAR to at least one transport block carried by at least one physical downlink shared channel (PDSCH).

Embodiments of the second aspect of the present disclosure provide a method for receiving a random access response, the method is applied to a terminal device, and the method includes: sending a random access preamble to a base station; determining a PDCCH; and receiving a random access response (RAR) corresponding to the random access preamble from a transport block carried by a PDSCH scheduled by the PDCCH.

Embodiments of the third aspect of the present disclosure provide a base station, including a processor, a transceiver, a memory, and a computer program stored on the memory, where the processor runs the computer program to implement the method for sending a random access response according to the foregoing embodiments of the first aspect.

Embodiments of the fourth aspect of the present disclosure provide a terminal device, including a processor, a transceiver, a memory, and a computer program stored on the memory, where the processor runs the computer program to implement the method for receiving a random access according to the foregoing embodiments of the second aspect.

Additional aspects and advantages of the present disclosure will be partially given in the following description, and will partially become apparent from the following description, or may be learned through the practice of the present disclosure.

BRIEF DESCRIPTION OF THE DRAWINGS

The above and/or additional aspects and advantages of the present disclosure will become apparent and readily appreciated from the following description of the embodiments in conjunction with the accompanying drawings, in which:

FIG. 7 is a flowchart of another method for sending a random access response provided according to some embodiments of the present disclosure;

FIG. 8 is a flowchart of another method for sending a random access response provided according to some embodiments of the present disclosure;

DETAILED DESCRIPTION

Figure 1:
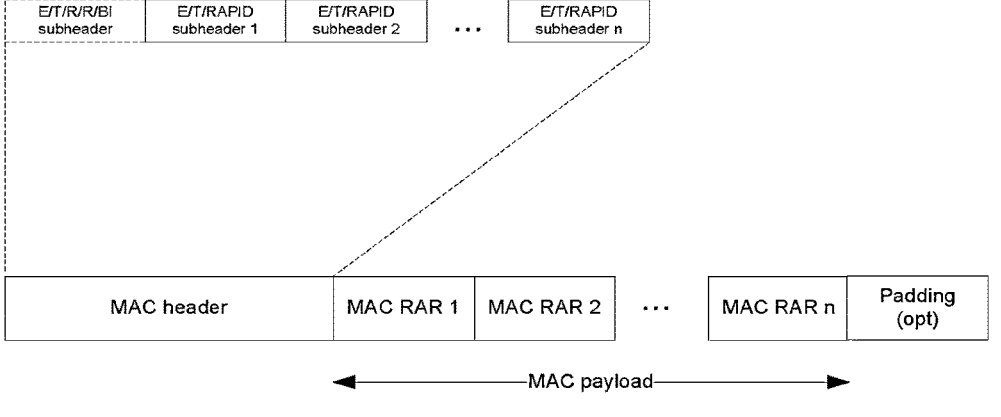
FIG. 1 is an example diagram that a plurality of sent RARs may be multiplexed in one data packet in the related art.

Embodiments of the present disclosure are described in detail below, examples of which are shown in the accompanying drawings, in which the same or similar reference numerals throughout represent the same or similar elements or elements having the same or similar functions. The embodiments described below with reference to the drawings are exemplary, and are intended to explain the present disclosure, but cannot be construed as limiting the present disclosure.

In LTE 4G (the 4th Generation Mobile Communication Technology) system, in order to support the Internet of Things service, an MTC technology and an NB-IoT technology are provided. The MTC technology and the NB-IoT technology are mainly directed to scenes such as low rate and high time delay, for example, scenes such as remote meter reading, environment monitoring and the like. The NB-IoT technology currently supports a maximum rate of hundreds of thousands of bytes, and the MTC technology currently supports a maximum rate of several megabits. With the continuous development of Internet of Things services, for example, popularization of services such as video monitoring, smart home, wearable devices, industrial sensing monitoring and the like, these services usually require a very high rate, such as a rate of dozens to 100 M, while also having relatively higher requirements for time delay, so that it is difficult for the MTC technology and the NB-IoT technology in LTE to meet the requirements. Based on this situation, many companies propose designing a new user equipment in a 5G new air interface to cover the requirements of such a terminal Internet of Things device. In the current 3GPP standardization, this new terminal type is called as Reduced Capability UE or simply called as NR-Lite.

Figure 2:
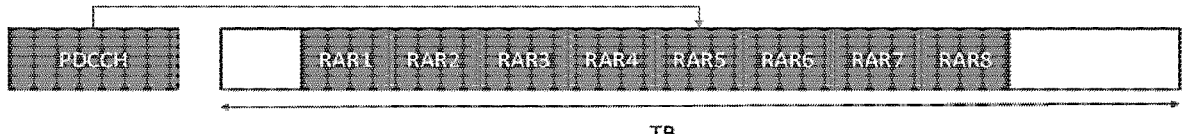
FIG. 2 is an example diagram that the PDCCH schedules a data packet loaded with a plurality of RARs in the related art.

Meanwhile, on the other hand, similar to the Internet of Things devices in LTE, the Internet of Things devices based on 5G NR-Lite generally need to meet the following requirements: low cost, low complexity, coverage enhancement to a certain degree, and power saving. When entering the Internet of Things network, the terminal device needs to initiate random access to the base station. After initiating the random access, the terminal device firstly sends a preamble. After receiving the preamble, the base station transmits a random access response (RAR). Since the base station may receive a plurality of preambles on the same time-frequency resource, it may respond to the plurality of preambles. That is, a plurality of RARs are sent at the same time. As shown in FIG. 1, a plurality of sent RARs may be multiplexed in one data packet. As shown in FIG. 2, a data packet loaded with a plurality of RARs is scheduled by a physical downlink control channel (PDCCH) of the RARs, and the PDCCH is scrambled by a RA-RNTI (Random Access Radio Network Temporary Identifier).

After sending the preamble, the terminal device may detect the PDCCH scrambled by the RA-RNTI in a corresponding random access response window, and receive the data packet including the corresponding RAR through the PDCCH. For example, the data packet including the corresponding RAR received by the terminal device through the PDCCH is a data packet as shown in FIG. 2, and the terminal device may find the corresponding RAR in the data packet according to the sent preamble.

For a Reducap terminal device, due to the reduction of the capability of the terminal device, for example, the reduction of the receiving antenna, coverage loss can be brought. Therefore, coverage enhancement needs to be performed. In the related art, after the terminal device initiates random access, coverage enhancement is usually performed between the base station and the terminal device in the following manners: 1) a manner of repeating transmission, for example, repeatedly transmitting the data of the terminal device for a plurality of times; and 2) performing coverage enhancement by using a manner of transport block size (TBS) scaling, that is, the same TBS may use more resources, which is equivalent to reducing the code rate in a disguised manner and increasing coverage.

However, for a Reducap terminal device that needs to perform coverage enhancement, when a plurality of RARs are multiplexed in one data packet, it may cause a data packet to be excessively large, and require more repeated transmissions. The reception of more repeated transmissions may result in an enhancement of the power of the terminal device. In another aspect, if using the TBS scaling to perform coverage enhancement, due to the limitation of a Reducap transmission resource, an excessively large data packet may bring a limitation of scaling, thus affecting the coverage effect.

For the foregoing problems, the embodiments of the present disclosure provide a method for sending a random access response, a method for receiving a random access response, an apparatus for sending a random access response, an apparatus for receiving a random access response, a base station, a terminal device, and a storage medium. Among them, the terminal device may be understood as the terminal device in the embodiments of the present disclosure, and the terminal device may be a Reducap terminal. Among them, the terminal device may be a transmitter in a communication scene, where the transmitter may be understood as a signal sender, and as an example, the transmitter may be understood as an initiator for random access, and the transmitter may be one of the terminal devices such as a mobile phone or a wearable device, or the transmitter may also be one of the terminal devices that may be used for Internet of Things services, such as a smart home device, a video monitoring device, an industrial sensing monitoring device, etc.

The method for sending a random access response, the method for receiving a random access response, the apparatus, the base station, the terminal device and the storage medium in the embodiments of the present disclosure are described below with reference to the accompanying drawings.

Figure 3:
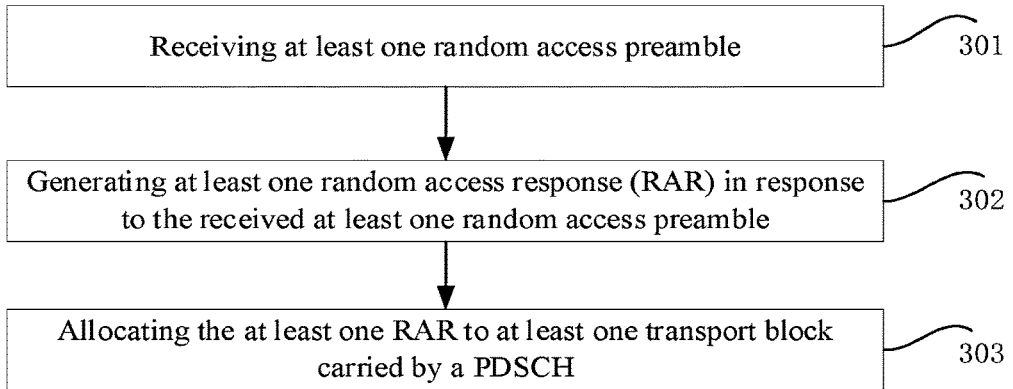
FIG. 3 is a flowchart of a method for sending a random access response provided according to some embodiments of the present disclosure.

For convenience of illustration, the following implementation focuses on the base station side to illustrate the method for sending a random access response in the embodiments of the present disclosure. FIG. 3 is a flowchart of a method for sending a random access response provided according to some embodiments of the present disclosure, where the method is applied to a base station. As shown in FIG. 3, the method for sending a random access response may include the following steps.

In step 301, at least one random access preamble is received.

Among them, in the description of the present disclosure, the meaning of "at least one" is one or more, and the meaning of "a plurality of" is at least two, for example, two, three, etc.

In some embodiments of the present disclosure, the at least one random access preamble may be sent by at least one terminal device. Among them, it may be understood that the number of the random access preambles received by the base station is the same as the number of the terminal devices initiating random access. In some embodiments, a plurality of terminal devices may use the same random access preamble, and then, the number of random access preambles received by the base station may be greater than the number of terminal devices that send the random access preambles.

As an example, the base station may receive at least one random access preamble sent by the at least one terminal device on a same PRACH (Physical Random Access Channel) time-frequency resource. For example, it is assumed that at least one terminal device may initiate random access to the base station. For example, one terminal device sends a preamble to the base station. The base station may receive, on the same time-frequency resource, a respective random access preamble sent by the at least one terminal device. Since the number of the terminal devices is at least one, the number of the random access preambles received by the base station on the same time-frequency resource is also at least one.

In step 302, in response to the received at least one random access preamble, at least one random access response (RAR) is generated.

In some embodiments, when the base station receives at least one random access preamble sent by the at least one terminal device on the same time-frequency resource, the base station may respectively initiate a corresponding random access response (RAR) to the at least one terminal device, where the random access response may be sent in a random access response window.

In step 303, at least one RAR is allocated to at least one transport block carried by a physical downlink shared channel (PDSCH).

It should be noted that the PDSCH is used to carry data from a transmission channel, where the data carried on the PDSCH may be presented by a transport block. In the embodiment of the present disclosure, when generating at least one RAR, the base station may allocate the generated at least one RAR to at least one transport block carried by the PDSCH, so as to carry the at least one RAR in the form of the transport block through at least one PDSCH and send the RAR to the corresponding terminal device through the PDSCH carrying the transport block. Among them, the transport block (TB) may be understood as a basic unit of data exchange between a MAC (Media Access Control) sublayer and a physical layer for physical layer processing.

In some embodiments, the base station may combine the random access responses (RAR) corresponding to the random access preambles sent by the terminal device on the same time-frequency resource into one or more transport blocks, and the one or more transport blocks are carried by one or more PDSCHs. For example, each transport block is carried by one PDSCH. It should be noted that, in some embodiments of the present disclosure, the number of PDSCHs may be determined by the number of random access responses (RAR) corresponding to the random access preambles sent on the same time-frequency resource. For example, when the number of random access responses (RAR) is less, for example, the base station sends a less number (e.g., less than a certain number, such as one or two) of random access responses (RAR) on the same time-frequency resource, the base station may allocate the less number of random access responses (RAR) to a transport block carried by the PDSCH, and the number of the PDSCHs is the same as the number of the transport block. For another example, when the number of random access responses (RAR) is larger (for example, greater than or equal to a certain number), the base station may distribute the larger number of random access responses (RAR) in a plurality of transport blocks carried by the PDSCHs, and the number of the PDSCHs is the same as the number of the transport block.

Figure 4A:
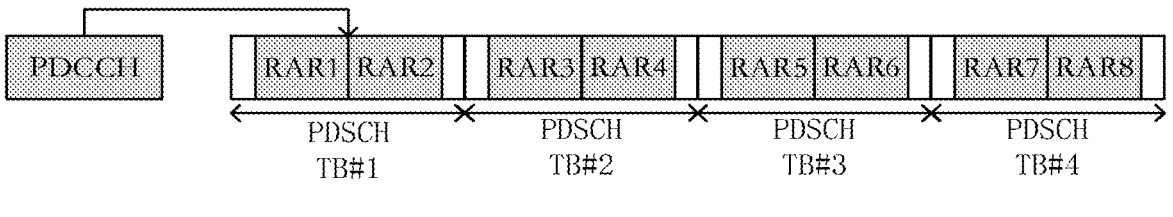
FIG. 4*a* is a first example diagram of loading data of a plurality of random access responses according to some embodiments of the present disclosure.

As an example of a possible implementation, as shown in FIG. 4a, assuming that the number of the random access preambles is 8 (i.e. assuming that the base station receives eight random access preambles) as an example, when receiving eight random access preambles on the same time-frequency resource, the base station may send corresponding random access responses (RAR) to the eight terminal devices. The number of random access responses (RAR) is eight, such as RAR 1, RAR 2, RAR 3, RAR 4, RAR 5, RAR 6, RAR 7, and RAR 8. The eight random access responses (RAR) of RAR 1, RAR 2, RAR 3, RAR 4, RAR 5, RAR 6, RAR 7, and RAR 8 may be allocated to four transport blocks (TB), such as transport block TB #1, transport block TB #2, transport block TB #3 and transport block TB #4. Each transport block is carried by one PDSCH.

Figure 4B:
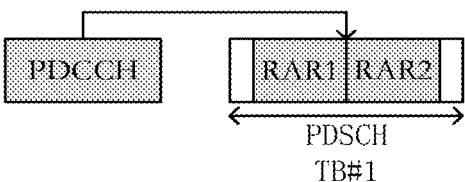
FIG. 4*b* is a second example diagram of loading data of a plurality of random access responses according to some embodiments of the present disclosure.

As another possible implementation example, as shown in FIG. 4b, assuming that the number of random access preambles is 2 (i.e., assuming that the base station receives two random access preambles), when receiving two random access preambles on the same time-frequency resource, the base station may send corresponding random access responses to the two terminal devices. The number of random access responses (RAR) is 2, for example, RAR 1 and RAR 2. The two random access responses (RAR) of the RAR 1 and the RAR 2 may be allocated to one transport block TB, for example, transport block TB #1. The transport block is carried by one PDSCH.

It should be noted that, in some embodiments of the present disclosure, the set capacity size setting of the transport block carried by the PDSCH may be the same. Among them, in some embodiments, the capacity of the transport block may be understood as the size of the transport block, that is, the number of bits included in the transport block.

In some embodiments, the capacity size of the transport block carried by the PDSCH may be the same, that is, the capacity size of each transport block carried by the PDSCH may be the same. It will be appreciated that in a given transport block set, sizes of all transport blocks are fixed and the same. Among them, when the capacity of some or a certain transport block carried by the PDSCH is insufficient, the remaining capacity of the transport block carried by the PDSCH may be padded by using the manner of information filling.

For example, in response to the information size of at least one RAR allocated in the transport block carried by the PDSCH being lower than the set capacity size of the transport block carried by the PDSCH, the transport block carried by the PDSCH is performed information filling and padding until reaching the set capacity size. That is to say, in order to enable the capacity size of each transport block carried by the PDSCH to be the same, when a random access response is stored in a certain transport block carried by the PDSCH, it is identified that whether the information size for storing the random access response in the transport block carried by the PDSCH is lower than the set capacity size value of the transport block carried by the PDSCH or not. If the information size for storing the random access response in the transport block carried by the PDSCH is lower than the set capacity size value of the transport block carried by the PDSCH, the remaining capacity of the transport block carried by the PDSCH is performed information filling and padding, until the current capacity size of the PDSCH reaches the set capacity size of the PDSCH, that is, reaching the maximum capacity limit value of the transport block carried by the PDSCH. If the information size for storing the random access response in the transport block carried by the PDSCH is not lower than the set capacity value of the transport block carried by the PDSCH, the transport block carried by the PDSCH is not performed information filling and padding.

In some embodiments of the present disclosure, the set capacity size setting of the transport block carried by the PDSCH may be different. As an example, the number of random access responses (RAR) included in a plurality of transport blocks carried by the PDSCHs may be different. For example, eight random access responses (RAR) are distributed in three transport blocks (TB) carried by the PDSCH, where the random access responses (RAR) included in the transport block TB #1 are RAR 1 and RAR 2, the random access responses (RAR) included in the transport block TB #2 are RAR 3, RAR 4, and RAR 5, and the random access responses (RAR) included in the transport block TB #3 are RAR 6, RAR 7, and RAR 8. Among them, the number of random access responses (RAR) included in the transport block TB #2 and the transport block TB #3 is respectively different from the number of random access responses (RAR) included in the transport block TB #1. It should be noted that the set capacity size of the transport block carried by the PDSCH may be determined by a communication protocol between the base station and the terminal device, which is not specifically defined in the present disclosure.

In summary, according to the method for sending a random access response in the embodiments of the present disclosure, the base station receives different random access preambles on the same time-frequency resource, and allocates the random access responses (RAR) respectively corresponding to the different random access preambles to different transport blocks, where each transport block is carried by the PDSCH. In this way, the terminal device side determines a target transport block that includes the random access response (RAR) corresponding to itself from a corresponding transport block carried by the PDSCH, and can determine a random access response (RAR) corresponding to the random access preamble sent by itself. Thus, by allocating different random access responses (RAR) to different transport blocks on the base station side, the size of the transport block transmitted to the terminal side by the base station is reduced, and the monitoring time of each terminal is reduced, so that the power consumption of the terminal can be reduced, and the coverage enhancement effect is improved.

Figure 5:
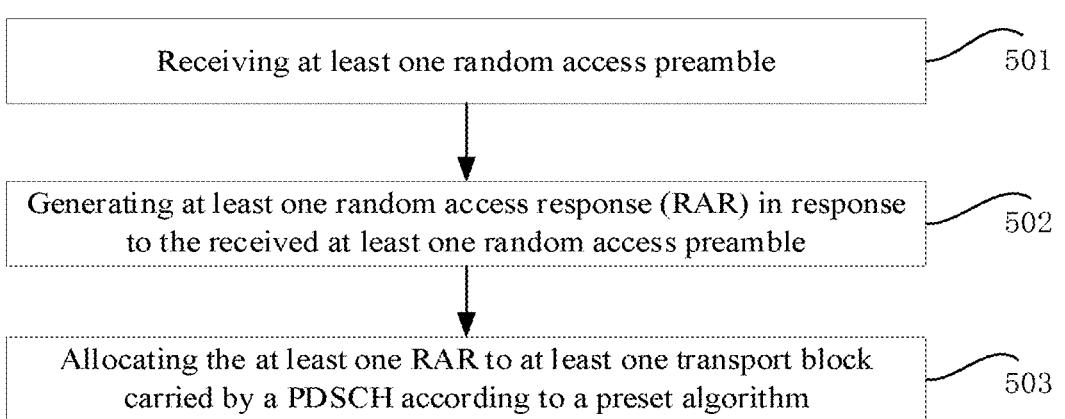
FIG. 5 is a flowchart of a method for sending a random access response according to some embodiments of the present disclosure.

It should be noted that in some embodiments of the present disclosure, the base station may allocate at least one RAR to at least one transport block carried by a physical downlink shared channel (PDSCH) according to a preset algorithm. Among them, the preset algorithm may be pre-defined in a communication protocol between the base station and the terminal device. FIG. 5 is a flowchart of a method for sending a random access response according to some embodiments of the present disclosure, where the method for sending a random access response is applied to a base station. As shown in FIG. 5, the method for sending a random access response may include the following steps.

In step 501, at least one random access preamble is received.

In the embodiment of the present disclosure, step 501 may be implemented by respectively using any one of the embodiments of the present disclosure, and the embodiments of the present disclosure are not limited to this, and are not described repeatedly again.

In step 502, in response to the received at least one random access preamble, at least one random access response (RAR) is generated.

In the embodiment of the present disclosure, step 502 may be implemented by respectively using any one of the embodiments of the present disclosure, and the embodiments of the present disclosure are not limited to this, and are not described repeatedly again.

In step 503, the at least one RAR is allocated to at least one transport block carried by a PDSCH according to a preset algorithm.

In some embodiments, the preset algorithm is related to an index value in the at least one random access preamble, and/or a number of all transport blocks. Among them, the preset algorithm may be pre-defined in a communication protocol between the base station and the terminal device. The preset algorithm may be any algorithm, as long as the base station is enabled to allocate at least one random access response corresponding to at least one random access preamble to at least one transport block carried by the PDSCH according to the algorithm, and the terminal is enabled to identify the random access response (RAR) corresponding to the preamble sent by the terminal itself from the corresponding transport block carried by the PDSCH through the algorithm.

The following examples illustrate different distribution manners of at least one random access response (RAR).

Example 1

The base station receives at least one random access preamble, and may allocate at least one random access response (RAR) corresponding to the at least one random access preamble to at least one transport block carried by the PDSCH by using a preset algorithm based on the index value of the random access preamble. Among them, the preset algorithm may be a similarity calculation method, or a distance algorithm, or a random algorithm. For example, taking that the preset algorithm is the similarity calculation method and the number of the random access responses (RAR) is more than one as an example, based on the similarity calculation method, the similarity between the index values of a plurality of random access preambles may be calculated, the random access responses (RAR) corresponding to the random access preambles with a similarity greater than or equal to a certain threshold may be distributed in a same transport block, and the random access responses (RAR) corresponding to the random access preambles with a similarity smaller than a certain threshold may be distributed in different transport blocks. That is to say, based on the index values of the plurality of random access preambles, the random access responses (RAR) corresponding to the random access preambles with similar index values are grouped and placed in a same transport block, and the random access responses (RAR) corresponding to the random access preambles with a similarity of index values lower than the threshold are grouped and placed in different transport blocks, so that the plurality of random access responses (RAR) are distributed in at least one different transport block, where each transport block is carried by a corresponding PDSCH.

For another example, taking that the preset algorithm is the distance algorithm and the number of the random access responses (RAR) is more than one as an example, based on the distance algorithm, the distance between the index values of a plurality of random access preambles may be calculated, the random access responses (RAR) corresponding to the random access preambles with a distance smaller than a certain threshold may be distributed in a same transport block, and the random access responses (RAR) corresponding to the random access preambles with a distance greater than or equal to a certain threshold may be distributed in different transport blocks. That is to say, based on the index values of the plurality of random access preambles, the random access responses (RAR) corresponding to the random access preambles with a smaller distance are grouped and placed in a same transport block, and the random access responses (RAR) corresponding to the random access preambles with a distance greater than the threshold are grouped and placed in different transport blocks, so that the plurality of random access responses (RAR) are distributed in at least one different transport block, where each transport block is carried by a corresponding PDSCH. In some embodiments of the present disclosure, the distance algorithm may be a Euclidean distance algorithm or a Hamming distance algorithm or the like, which is not specifically limited in the present disclosure.

For another example, taking that the preset algorithm is the random algorithm and the number of the random access responses (RAR) is more than one as an example, the random access responses (RAR) corresponding to the random access preambles may be randomly distributed in different transport blocks based on the index values of the plurality of random access preambles, where each transport block is carried by a corresponding PDSCH.

Example 2

The base station receives at least one random access preamble, and may distribute at least one random access response (RAR) corresponding to the at least one random access preamble in at least one transport block carried by a PDSCH by using a preset algorithm based on the index value of the random access preamble. Among them, the preset algorithm may be related to the number of all transport blocks. For example, it is assumed that the total number of all transport blocks has been pre-defined between the base station and the terminal device, such as the total number being N. Taking that the preset algorithm is the random algorithm and the number of the random access responses (RAR) is more than one as an example, the random access responses (RAR) corresponding to the random access preambles may be allocated in N different transport blocks based on the index values of the plurality of random access preambles, where each transport block is carried by a corresponding PDSCH.

For another example, it is assumed that the total number of all transport blocks has been pre-defined between the base station and the terminal device, such as the total number being N. The base station may allocate the plurality of random access responses (RAR) respectively to the corresponding transport blocks according to the reception time of the random access preambles. Among them, each transport block is carried by a corresponding PDSCH.

Example 3

It is assumed that the total number of all transport blocks has been pre-defined between the base station and the terminal device, such as the total number being N, and the number of random access responses (RAR) is more than one. The base station receives a plurality of random access preambles, and may allocate a plurality of random access responses (RAR) corresponding to the plurality of random access preambles to at least one transport block carried by a PDSCH by using a preset algorithm based on the index value of the random access preamble. Among them, the preset algorithm is related to the index value of the random access preamble and the number of all transport blocks.

As an example of a possible implementation, a modulo operation may be performed on the index value of a certain random access preamble and the number N of all transport blocks to obtain an operation result, and the operation result is added with 1 to sum up, so as to obtain a position index value of a transport block carrying a RAR corresponding to the random access preamble, thus allocating the RAR to the corresponding transport block carried by the PDSCH. That is to say, the base station may determine, based on the index value of the random access preamble and the number N of transport blocks carried by the PDSCHs, the location of the transport block where the current random access response (RAR) should be distributed.

Figure 6:
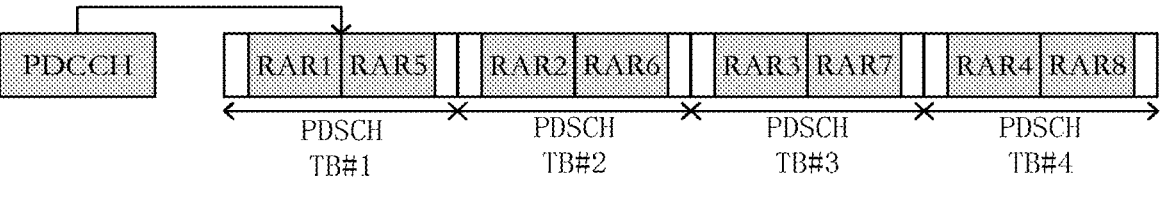
FIG. 6 is a third example diagram of loading data of a plurality of random access responses according to some embodiments of the present disclosure.

For example, as shown in FIG. 6, it is assumed that the number of random access preambles is 8 (i.e., assuming that the base station receives eight random access preambles), the number N of all transport blocks is 4, the index values of the eight random access preambles are respectively 32, 33, 34, 35, 36, 37, 38 and 39, and the random access responses (RAR) respectively corresponding to the eight random access preambles are RAR 1, RAR 2, RAR 3, RAR 4, RAR 5, RAR 6, RAR 7, and RAR 8, respectively. The base station receives the eight random access preambles, and may perform a modulo operation by using the index values of the eight random access preambles and the number N (the numerical value being 4) of the transport blocks carried by the PDSCHs respectively. The obtained operation results are: 0, 1, 2, 3, 0, 1, 2 and 3, respectively and successively. Each numerical value in the operation results is respectively added with 1 to sum up, so as to obtain a position index value of the transport block. Thus, the random access response RAR 1 may be placed in the transport block TB #1 corresponding to the position index value 1, the random access response RAR 2 may be placed in the transport block TB #2 corresponding to the position index value 2, the random access response RAR 3 may be placed in the transport block TB #3 corresponding to the position index value 3, the random access response RAR 4 may be placed in the transport block TB #4 corresponding to the position index value 4, the random access response RAR 5 may be placed in the transport block TB #1 corresponding to the position index value 1, the random access response RAR 6 may be placed in the transport block TB #2 corresponding to the position index value 2, the random access response RAR 7 may be placed in the transport block TB #3 corresponding to the position index value 3, and the random access response RAR 8 may be placed in the transport block TB #4 corresponding to the position index value 4.

It should be noted that the above-mentioned preset algorithm is an example provided for the convenience of those skilled in the art to understand the embodiments of the present disclosure, and cannot be used as a specific limitation on the present disclosure. That is to say, the preset algorithm may further be another algorithm that enables the base station to allocate at least one random access response corresponding to at least one random access preamble in at least one transport block carried by a PDSCH according to the algorithm, and enables the terminal to identify the target transport block corresponding to the terminal itself from the corresponding PDCCH through the algorithm.

In summary, according to the method for sending a random access response in the embodiments of the present disclosure, the base station may allocate at least one random access response (RAR) to at least one transport block carried by a PDSCH according to a preset algorithm, the size of the transport block can be reduced, and the monitoring time of each terminal can be reduced, so that the power consumption of the terminal can be reduced, and the coverage enhancement effect is improved.

It should be noted that, in some embodiments, at least one transport block carried by the PDSCH may be scheduled through a physical downlink control channel (PDCCH). That is, the base station may schedule the transport block carried by the PDSCH through the PDCCH, so that the base station sends the RAR required by the terminal device to the terminal device through the PDCCH. As an example, when distributing at least one random access response in at least one transport block carried by the PDSCH, the base station may schedule all transport blocks carried by the PDSCHs in the at least one transport block carried by the PDSCH through a same PDCCH, or may schedule different transport blocks carried by the PDSCHs through different PDCCHs. In some embodiments, the same PDCCH may be one PDCCH, or may be a plurality of same PDCCHs. Examples of different implementations of these two manners will be given below.

FIG. 7 is a flowchart of another method for sending a random access response provided according to some embodiments of the present disclosure, where the method is applied to a base station. In the embodiment of the present disclosure, the base station may schedule at least one transport block carried by the PDSCH through a same PDCCH. As shown in FIG. 7, the method for sending a random access response may include the following steps.

In step 701, at least one random access preamble is received.

In the embodiments of the present disclosure, step 701 may be implemented by respectively using any one of the embodiments of the present disclosure, and the embodiments of the present disclosure are not limited to this, and are not described repeatedly again.

In step 702, in response to the received at least one random access preamble, at least one random access response (RAR) is generated.

In the embodiment of the present disclosure, step 702 may be implemented by respectively using any one of the embodiments of the present disclosure, and the embodiments of the present disclosure are not limited to this, and are not described repeatedly again.

In step 703, at least one RAR is allocated to at least one transport block carried by a PDSCH.

In the embodiment of the present disclosure, step 703 may be implemented by respectively using any one of the embodiments of the present disclosure, and the embodiments of the present disclosure are not limited to this, and are not described repeatedly again.

In step 704, all transport blocks carried by the PDSCHs in the at least one transport block carried by the PDSCH is scheduled by a same PDCCH.

In some embodiments of the present disclosure, when allocating at least one random access response corresponding to at least one random access preamble to at least one transport block carried by the PDSCH, the base station may schedule all transport blocks carried by the PDSCHs in the at least one transport block carried by the PDSCH through a same PDCCH, so as to respectively send the different transport blocks carried by the PDSCHs to the corresponding terminal devices. In some embodiments, the PDCCH carries DCI (Downlink Control Information) control information, the DCI is a special information set for scheduling a downlink data channel (such as a PDSCH), the DCI is downlink control information sent by the base station to the terminal device, and is used to indicate some attributes for transmitting the transport block. For example, the attribute may include, but is not limited to, uplink and downlink resource allocation, HARQ (Hybrid Automatic Repeat Request) information, power control, etc. As shown in the above embodiments, scheduling the transport block carried by the PDSCH through the PDCCH may refer to sending the DCI to the terminal device to notify the terminal device some attributes for transmitting the transport block, so that the terminal device finds the transport block carried by the PDSCH corresponding to itself from different transport blocks carried by the PDSCH according to the DCI. The plurality of PDCCHs may be a plurality of PDCCH transmissions, and each PDCCH transmission may include downlink control information (DCI) and a cyclic redundancy check code (CRC).

For example, when the base station allocates at least one random access response corresponding to at least one random access preamble in at least one transport block carried by the PDSCH and schedules the at least one transport block carried by the PDSCH through the same PDCCH, the terminal device can determine a target PDCCH corresponding to itself, and determine a target transport block from at least one transport block carried by the PDSCH scheduled by the target PDCCH, where the target transport block includes a random access response (RAR) corresponding to the terminal device, so that the terminal device can obtain a random access response (RAR) corresponding to the terminal device from the target transport block.

It should be noted that, in some embodiments of the present disclosure, a plurality of transport blocks carried by the PDSCHs may share a part of scheduling resource. Among them, in some embodiments of the present disclosure, the scheduling resource may include, but is not limited to, one or more of an MCS (Modulation and Coding Scheme), a frequency resource, and the like. For example, the scheduling resource may include an MCS or a frequency resource. For another example, the scheduling resource may include an MCS and a frequency resource. As an example, a plurality of transport blocks carried by the PDSCHs may share a part of scheduling resource such as an MCS or a frequency resource, that is, the plurality of transport blocks carried by the PDSCHs may share a part of scheduling resource such as an MCS or a frequency resource, when scheduled by the same PDCCH. Alternatively, the plurality of transport blocks carried by the PDSCHs can share a part of scheduling resource such as an MCS and a frequency resource, that is, the plurality of transport blocks carried by the PDSCHs can share a part of scheduling resource such as an MCS and a frequency resource, when scheduled by the same PDCCH.

In some embodiments of the present disclosure, the control information sent on the PDCCH may include, but is not limited to, an MCS or a transmission resource associated with a plurality of transport blocks carried by the PDSCHs. As an example, the plurality of transport blocks carried by the PDSCHs may share a part of scheduling resource such as an MCS or a frequency resource, that is to say, the plurality of transport blocks carried by the PDSCHs may share a part of scheduling resource such as an MCS or a frequency resourced, when scheduled by the same PDCCH.

It should be noted that, when scheduling at least one transport block carried by the PDSCH through the same PDCCH, there may be many scheduling manners used, for example, being continuously and respectively scheduled in the time domain, or being respectively scheduled at a certain interval. In some embodiments of the present disclosure, the plurality of transport blocks carried by the PDSCHs may be continuous in time, or have a time interval with each other. As an example, when a base station schedules a plurality of transport blocks carried by the PDSCHs through the same PDCCH, the plurality of scheduled transport blocks carried by the PDSCHs may be continuous in the time domain, or the plurality of scheduled transport blocks carried by the PDSCHs may have a certain interval with each other in the time domain. That is to say, when the base station schedules a plurality of transport blocks carried by the PDSCHs through the same PDCCH, the plurality of transport blocks carried by the PDSCHs may be continuously scheduled one by one in the time domain by the same PDSCH; or, the plurality of transport blocks carried by the PDSCHs may be scheduled every other period of time by the same PDSCH.

In some embodiments of the present disclosure, the base station allocates at least one random access response corresponding to at least one random access preamble to at least one transport block carried by the PDSCH, where there are different PDSCHs on the PDCCH, and control information can also be sent on the PDCCH. In some embodiments, the control information sent on the PDCCH may include, but is not limited to, the number of all transport blocks carried by the PDSCHs, and/or the number of RARs included in each transport block carried by the PDSCH, etc.

Example 1

The base station allocates at least one random access response corresponding to at least one random access preamble to at least one transport block carried by a PDSCH, schedules the at least one transport block carried by the PDSCH through a same PDCCH, and can also send control information on the PDCCH. Among them, the control information sent on the PDCCH may include the number of all transport blocks carried by the PDSCHs, so that the terminal device identifies a target transport block where the random access response (RAR) corresponding to the random access preamble sent by itself is located from all transport blocks carried in the target PDSCH based on the control information in the PDCCH.

Example 2

The base station allocates at least one random access response corresponding to at least one random access preamble to at least one transport block carried by a PDSCH, schedules the at least one transport block carried by the PDSCH through a same PDCCH, and can also send control information on the PDCCH. Among them, the control information sent on the PDCCH may include the number of RARs included in each transport block carried by the PDSCH, so that the terminal device identifies a target transport block where the random access response (RAR) corresponding to the random access preamble sent by itself is located from all the transport blocks carried in the target PDSCH based on the control information in the PDCCH.

Example 3

The base station allocates at least one random access response corresponding to at least one random access preamble to at least one transport block carried by a PDSCH, schedules the at least one transport block carried by the PDSCH through a same PDCCH, and can also send control information on the PDCCH. Among them, the control information sent on the PDCCH may include the number of all transport blocks carried by the PDSCHs and the number of RARs included in each transport block carried by the PDSCH, so that the terminal device identifies a target transport block where the random access response (RAR) corresponding to the random access preamble sent by itself is located from all transport blocks carried in the target PDSCH based on the control information in the PDCCH.

In some embodiments of the present disclosure, the base station allocates at least one random access response corresponding to at least one random access preamble to at least one transport block carried by a PDSCH, where the base station may notify the following through broadcast signaling: the number of all transport blocks carried by the PDSCHs and/or the number of RARs included in each transport block carried by the PDSCH.

Example 1

When the base station allocates at least one random access response corresponding to at least one random access preamble in at least one transport block carried by a PDSCH, and schedules the at least one transport block carried by the PDSCH through a same PDCCH, the base station may notify the number of all transport blocks carried by the PDSCHs through broadcast signaling. That is to say, the number of all transport blocks carried by the PDSCHs can be notified to each terminal device through the broadcast signaling, so that the terminal device identifies a target transport block where the random access response (RAR) corresponding to the random access preamble sent by itself is located from all transport blocks carried in the target PDCCH based on a notification message in the broadcast signaling.

Example 2

When the base station allocates at least one random access response corresponding to at least one random access preamble in at least one transport block carried by a PDSCH, and schedules the at least one transport block carried by the PDSCH through a same PDCCH, the base station may notify the number of RARs included in each transport block carried by the PDSCH through broadcast signaling. That is to say, the number of RARs included in each transport block carried by the PDSCH can be notified to each terminal device through the broadcast signaling, so that the terminal device identifies a target transport block where the random access response (RAR) corresponding to the random access preamble sent by itself is located from all transport blocks carried in the target PDCCH based on a notification message in the broadcast signaling.

Example 3

When the base station allocates at least one random access response corresponding to at least one random access preamble in at least one transport block carried by a PDSCH, and schedules the at least one transport block carried by the PDSCH through a same PDCCH, the base station may notify the number of all transport blocks carried by the PDSCHs and the number of RARs included in each transport block carried by the PDSCH through broadcast signaling. That is to say, the number of all transport blocks carried by the PDSCHs and the number of RARs included in each transport block carried by the PDSCH can be notified to each terminal device through the broadcast signaling, so that the terminal device identifies a target transport block where the random access response (RAR) corresponding to the random access preamble sent by itself is located from all transport blocks carried in the target PDCCH based on a notification message in the broadcast signaling.

In summary, according to the method for sending a random access response in the embodiments of the present disclosure, the base station receives different random access preambles on a same time-frequency resource, and distributes the random access responses (RAR) respectively corresponding to the different random access preambles in different transport blocks, where each transport block is carried by a PDSCH, and the different transport blocks carried by the PDSCHs are scheduled through a same PDCCH. In this way, the terminal device side can determine the target transport block including the random access response (RAR) corresponding to itself from different transport blocks scheduled by a target PDCCH corresponding to itself, and can determine the random access response (RAR) corresponding to the random access preamble sent by itself from the target transport block. Thus, by distributing different random access responses (RAR) in different transport blocks on the base station side, the size of the transport block is reduced, and the monitoring time of each terminal is reduced, so that the power consumption of the terminal can be reduced, and the coverage enhancement effect is improved.

FIG. 8 is a flowchart of method for sending a random access response provided according to some embodiments of the present disclosure, where the method is applied to a base station. In the embodiment of the present disclosure, the base station may schedule different transport blocks carried by the PDSCH through different PDCCHs. As shown in FIG. 8, the method for sending a random access response may include the following steps.

In step 801, a plurality of random access preambles are received.

In the embodiment of the present disclosure, step 801 may be implemented by respectively using any one of the embodiments of the present disclosure, and the embodiments of the present disclosure are not limited to this, and are not described repeatedly again.

In step 802, a plurality of random access responses (RAR) are generated in response to the received plurality of random access preambles.

In the embodiment of the present disclosure, step 802 may be implemented by respectively using any one of the embodiments of the present disclosure, and the embodiments of the present disclosure are not limited to this, and are not described repeatedly again.

In step 803, the plurality of RARs are allocated to a plurality of transport blocks carried by PDSCHs.

In the embodiment of the present disclosure, step 803 may be implemented by respectively using any one of the embodiments of the present disclosure, and the embodiments of the present disclosure are not limited to this, and are not described repeatedly again.

In step 804, different transport blocks carried by the PDSCHs are respectively scheduled through a plurality of different PDCCHs.

In some embodiments of the present disclosure, when a base station allocates a plurality of random access responses corresponding to a plurality of random access preambles to a plurality of transport blocks carried by PDSCHs, the base station can respectively schedule different transport blocks carried by the PDSCHs through a plurality of different PDCCHs. In some embodiments, the plurality of different PDCCHs have a corresponding relationship with the plurality of scheduled transport blocks carried by the PDSCHs. As an example, the number of transport blocks carried by the PDSCHs is the same as the number of the PDCCHs. For example, assuming that the base station distributes eight random access responses in four transport blocks carried by the PDSCHs, the base station may schedule the four transport blocks carried by the PDSCHs through four different PDCCHs, that is, each PDCCH schedules a corresponding transport block carried by the PDSCH.

In some embodiments, a plurality of transport blocks carried by the PDSCHs may be scheduled by a plurality of PDCCHs, where some of the plurality of PDCCHs may be the same. For example, it is assumed that the base station distributes eight random access responses in four transport blocks carried by the PDSCHs, where the transport block 1 and the transport block 2 are scheduled respectively by using a same PDCCH, and the transport block 3 and the transport block 4 are scheduled respectively by using different PDCCHs.

It should be noted that, in order to enable the terminal device to understand that a target PDCCH corresponding to the terminal device should be found from the plurality of PDCCHs, so as to reduce the monitoring time of the terminal device and reduce the power consumption of the terminal. In some embodiments of the present disclosure, control information carried by the plurality of different PDCCHs is respectively associated with different scrambling codes for scrambling. In some embodiments, the PDCCH carries DCI control information, the DCI is a special information set for scheduling a downlink data channel (such as a PDSCH), the DCI is downlink control information sent by the base station to the terminal device, and is used to indicate some attributes for transmitting a transport block. For example, the attribute may include, but is not limited to, uplink and downlink resource allocation, HARQ information, power control, and the like. In some embodiments, the scrambling code may be added to a cyclic redundancy check (CRC) corresponding to the DCI. The scrambling code is added to the CRC, so as to ensure the correctness of the DCI, and the terminal device may obtain the CRC according to the descrambling of the scrambling code, thus determining the PDCCH corresponding to the terminal device. That is, the terminal device may obtain a PDCCH corresponding to itself from a plurality of different PDCCHs.

Among them, in some embodiments, the scrambling code associated with the control information carried by the PDCCH is related to the random access preamble corresponding to the RAR included in the correspondingly scheduled transport block carried by the PDSCH. For example, a plurality of different PDCCHs may respectively use different RA-RNTIs for scrambling, that is, each PDCCH may respectively use different RA-RNTIs for scrambling. The RA-RNTI used by each PDCCH may be determined based on information of a random access preamble corresponding to a random access response. In this way, the terminal may determine a target PDCCH that needs to be detected according to the random access preamble sent by itself.

In some embodiments of the present disclosure, the plurality of different PDCCHs may use different transmission resources respectively. Among them, in some embodiments, the transmission resource used by each PDCCH is related to the random access preamble corresponding to the random access response included in the PDSCH. For example, a plurality of different PDCCHs may be transmitted on different transmission resources, for example, may be transmitted in different control resource sets, and the transmission resource is determined according to the selected preamble of the terminal device. The terminal device determines a corresponding transmission resource of the target PDCCH according to the used preamble, and monitors the target PDCCH on the corresponding transmission resource.

For example, it is assumed that the number of random access preambles is 8 (i.e., assuming that the base station receives eight random access preambles), the number of transport blocks carried by the PDSCHs is 4, the index values of the eight random access preambles are respectively 32, 33, 34, 35, 36, 37, 38 and 39, and eight random access responses (RAR) corresponding to the eight random access preambles are RAR 1, RAR 2, RAR 3, RAR 4, RAR 5, RAR 6, RAR 7, and RAR 8, respectively. The base station receives the eight random access preambles, and may perform a modulo operation by using the index values of the eight random access preambles and the number (the numerical value being 4) of the transport blocks carried by the PDSCHs respectively. The obtained operation results are: 0, 1, 2, 3, 0, 1, 2 and 3, respectively and successively. Each numerical value in the operation results is respectively added with 1 to sum up, so as obtain a position index value of the transport block.

Figure 9:
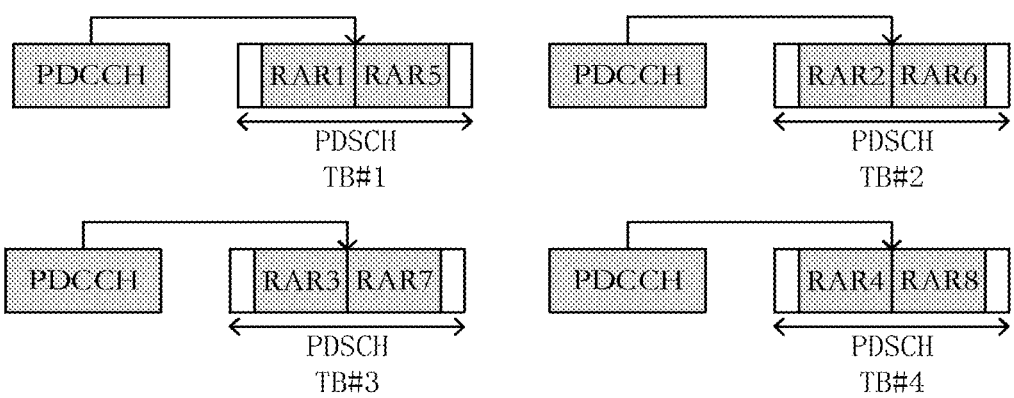
FIG. 9 is a fourth example diagram of loading data of a plurality of random access responses according to some embodiments of the present disclosure.

As shown in FIG. 9, the random access response RAR 1 can be placed in the transport block TB #1 corresponding to the position index value 1 of the transport block, the random access response RAR 2 can be placed in the transport block TB #2 corresponding to the position index value 2 of the transport block, the random access response RAR 3 can be placed in the transport block TB #3 corresponding to the position index value 3 of the transport block, the random access response RAR 4 can be placed in the transport block TB #4 corresponding to the position index value 4 of the transport block, the random access response RAR 5 can be placed in the transport block TB #1 corresponding to the position index value 1 of the transport block, the random access response RAR 6 can be placed in the transport block TB #2 corresponding to the position index value 2 of the transport block, the random access response RAR 7 can be placed in the transport block TB #3 corresponding to the position index value 3 of the transport block, and the random access response RAR 8 can be placed in the transport block TB #4 corresponding to the position index value 4 of the transport block. The base station schedules the four transport blocks carried by the PDSCHs through four different PDCCHs, where each PDCCH schedules a corresponding transport block carried by the PDSCH, and each transport block carried by the PDSCH includes two random access responses.

Among them, the four different PDCCHs may use different RA-RNTIs for scrambling, respectively. The RA-RNTI used by each PDCCH may be determined based on information of a random access preamble corresponding to a random access response. In this way, the terminal may determine the target PDCCH that needs to be detected according to the random access preamble sent by itself. The four different PDCCHs may be transmitted on different transmission resources, for example, may be transmitted in different control resource sets, and the transmission resource is determined according to the selected preamble of the terminal device. The terminal device determines the corresponding transmission resource of the target PDCCH according to the used preamble, and monitors the target PDCCH on the corresponding transmission resource.

In summary, according to the method for sending a random access response in the embodiments of the present disclosure, the base station receives different random access preambles on a same time-frequency resource, and allocates the random access responses (RAR) respectively corresponding to the different random access preambles to different transport blocks, where each transport block is carried by a PDSCH, and the different transport blocks carried by the PDSCHs are scheduled through different PDCCHs. Among them, different PDCCHs have a corresponding relationship with transport blocks carried by the PDSCHs. In this way, the terminal device side can determine a target transport block including the random access response (RAR) corresponding to itself from different transport blocks scheduled by the target PDCCH corresponding to itself, and can determine the random access response (RAR) corresponding to the random access preamble sent by itself from the target transport block. Thus, by distributing different random access responses (RAR) in different transport blocks on the base station side, the size of the transport block is reduced and the monitoring time of each terminal is reduced, so that the power consumption of the terminal can be reduced, and the coverage enhancement effect is improved.

Figure 10:
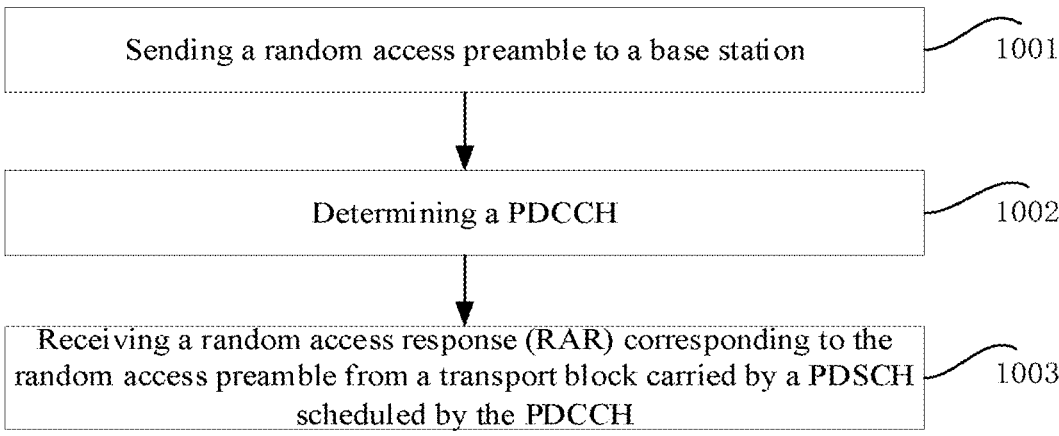
FIG. 10 is a flowchart of a method for receiving a random access response provided according to some embodiments of the present disclosure.

The following implementation focuses on the terminal device side to illustrate a method for receiving a random access response in the embodiments of the present disclosure. FIG. 10 is a flowchart of a method for receiving a random access response provided according to some embodiments of the present disclosure. Among them, the method for receiving a random access response may be applied to a terminal device. As shown in FIG. 10, the method for receiving a random access response may include the following steps.

In step 1001, a random access preamble is sent to a base station.

In some embodiments, it is assumed that the terminal device needs to access an Internet of Things network or a communication network, and the terminal device may send a random access preamble to the base station.

In step 1002, a PDCCH is determined.

In some embodiments, the PDCCH corresponding to the terminal device itself is determined.

In some embodiments of the present disclosure, the base station may receive at least one random access preamble sent by at least one terminal device on a same PRACH time-frequency resource. The base station may distribute at least one random access response corresponding to the at least one random access preamble in at least one transport block carried by a PDSCH, and schedule the at least one transport block carried by the PDSCH through the PDCCH. In some embodiments, a plurality of terminal devices may use a same random access preamble. Then, the number of random access preambles received by the base station may be greater than the number of terminal devices that send the random access preambles.

In some embodiments of the present disclosure, the base station may distribute at least one random access response corresponding to at least one random access preamble in at least one transport block carried by the PDSCH according to a preset algorithm. In some embodiments, the preset algorithm is related to an index value in the at least one random access preamble and/or the number of all transport blocks.

Among them, the preset algorithm may be pre-defined in a communication protocol between the base station and the terminal device. The preset algorithm may be any algorithm, as long as the base station is enabled to allocate at least one random access response corresponding to at least one random access preamble to at least one transport block carried by the PDSCH according to the algorithm, and the terminal is enabled to identify the random access response (RAR) corresponding to the preamble sent by the terminal itself from the corresponding transport block carried by the PDSCH through the algorithm.

The following examples illustrate different distribution manners of at least one random access response (RAR).

Example 1

The base station receives at least one random access preamble, and may allocate at least one random access response (RAR) corresponding to the at least one random access preamble to at least one transport block carried by the PDSCH by using a preset algorithm based on the index value of the random access preamble. Among them, the preset algorithm may be a similarity calculation method, or a distance algorithm, or a random algorithm. For example, taking that the preset algorithm is the similarity calculation method and the number of the random access responses (RAR) is more than one as an example, based on the similarity calculation method, the similarity between the index values of a plurality of random access preambles may be calculated, the random access responses (RAR) corresponding to the random access preambles with a similarity greater than or equal to a certain threshold may be distributed in a same transport block, and the random access responses (RAR) corresponding to the random access preambles with a similarity smaller than a certain threshold may be distributed in different transport blocks. That is to say, based on the index values of the plurality of random access preambles, the random access responses (RAR) corresponding to the random access preambles with similar index values are grouped and placed in a same transport block, and the random access responses (RAR) corresponding to the random access preambles with a similarity of index values lower than the threshold are grouped and placed in different transport blocks, so that the plurality of random access responses (RAR) are distributed in at least one different transport block, where each transport block is carried by a corresponding PDSCH.

For another example, taking that the preset algorithm is the distance algorithm and the number of the random access responses (RAR) is more than one as an example, based on the distance algorithm, the distance between the index values of a plurality of random access preambles may be calculated, the random access responses (RAR) corresponding to the random access preambles with a distance smaller than a certain threshold may be distributed in a same transport block, and the random access responses (RAR) corresponding to the random access preambles with a distance greater than or equal to a certain threshold may be distributed in different transport blocks. That is to say, based on the index values of the plurality of random access preambles, the random access responses (RAR) corresponding to the random access preambles with a smaller distance are grouped and placed in a same transport block, and the random access responses (RAR) corresponding to the random access preambles with a distance greater than the threshold are grouped and placed in different transport blocks, so that the plurality of random access responses (RAR) are distributed in at least one different transport block, where each transport block is carried by a corresponding PDSCH. In some embodiments of the present disclosure, the distance algorithm may be a Euclidean distance algorithm or a Hamming distance algorithm or the like, which is not specifically limited in the present disclosure.

For another example, taking that the preset algorithm is the random algorithm and the number of the random access responses (RAR) is more than one as an example, the random access responses (RAR) corresponding to the random access preambles may be randomly distributed in different transport blocks based on the index values of the plurality of random access preambles, where each transport block is carried by a corresponding PDSCH.

Example 2

The base station receives at least one random access preamble, and may distribute at least one random access response (RAR) corresponding to the at least one random access preamble in at least one transport block carried by a PDSCH by using a preset algorithm based on the index value of the random access preamble. Among them, the preset algorithm may be related to the number of all transport blocks. For example, it is assumed that the total number of all transport blocks has been pre-defined between the base station and the terminal device, such as the total number being N. Taking that the preset algorithm is the random algorithm and the number of the random access responses (RAR) is more than one as an example, the random access responses (RAR) corresponding to the random access preambles may be allocated in N different transport blocks based on the index values of the plurality of random access preambles, where each transport block is carried by a corresponding PDSCH.

For another example, it is assumed that the total number of all transport blocks has been pre-defined between the base station and the terminal device, such as the total number being N. The base station may allocate the plurality of random access responses (RAR) respectively to the corresponding transport blocks according to the reception time of the random access preambles. Among them, each transport block is carried by a corresponding PDSCH.

Example 3

It is assumed that the total number of all transport blocks has been pre-defined between the base station and the terminal device, such as the total number being N, and the number of random access responses (RAR) is more than one. The base station receives a plurality of random access preambles, and may allocate a plurality of random access responses (RAR) corresponding to the plurality of random access preambles to at least one transport block carried by a PDSCH by using a preset algorithm based on the index value of the random access preamble. Among them, the preset algorithm is related to the index value of the random access preamble and the number of all transport blocks.

As an example of a possible implementation, a modulo operation may be performed on a certain index value of the random access preamble and the number N of all transport blocks to obtain an operation result, and the operation result is added with 1 to sum up, so as to obtain a position index value of a transport block carrying the RAR corresponding to the random access preamble, thus allocating the RAR to the corresponding transport block carried by the PDSCH. That is to say, the base station may determine, based on the index value of the random access preamble and the number N of transport blocks carried by the PDSCHs, the location of the transport block where the current random access response (RAR) should be distributed.

For example, as shown in FIG. 6, it is assumed that the number of random access preambles is 8 (i.e., assuming that the base station receives eight random access preambles), the number N of all transport blocks is 4, the index values of the eight random access preambles are respectively 32, 33, 34, 35, 36, 37, 38 and 39, and the random access responses (RAR) respectively corresponding to the eight random access preambles are RAR 1, RAR 2, RAR 3, RAR 4, RAR 5, RAR 6, RAR 7, and RAR 8, respectively. The base station receives the eight random access preambles, and may perform a modulo operation by using the index values of the eight random access preambles and the number N (the numerical value being 4) of the transport blocks carried by the PDSCHs respectively. The obtained operation results are: 0, 1, 2, 3, 0, 1, 2 and 3, respectively and successively. Each numerical value in the operation results is added respectively with 1 to sum up, so as to obtain a position index value of the transport block. Thus, the random access response RAR 1 may be placed in the transport block TB #1 corresponding to the position index value 1, the random access response RAR 2 may be placed in the transport block TB #2 corresponding to the position index value 2, the random access response RAR 3 may be placed in the transport block TB #3 corresponding to the position index value 3, the random access response RAR 4 may be placed in the transport block TB #4 corresponding to the position index value 4, the random access response RAR 5 may be placed in the transport block TB #1 corresponding to the position index value 1, the random access response RAR 6 may be placed in the transport block TB #2 corresponding to the position index value 2, the random access response RAR 7 may be placed in the transport block TB #3 corresponding to the position index value 3, and the random access response RAR 8 may be placed in the transport block TB #4 corresponding to the position index value 4.

It should be noted that the above-mentioned preset algorithm is an example provided for the convenience of those skilled in the art to understand the embodiments of the present disclosure, and cannot be used as a specific limitation on the present disclosure. That is to say, the preset algorithm may further be another algorithm that enables the base station to allocate at least one random access response corresponding to at least one random access preamble in at least one transport block carried by a PDSCH according to the algorithm, and enables the terminal to identify the target transport block corresponding to the terminal itself from the corresponding PDCCH through the algorithm.

In some embodiments, the PDCCH has a corresponding relationship with the scheduled transport block carried by the PDSCH. As an example, the number of transport blocks carried by the PDSCHs is the same as the number of the PDCCHs. For example, assuming that the base station distributes eight random access responses in four transport blocks carried by the PDSCHs, the four transport blocks carried by the PDSCHs may be scheduled through four different PDCCHs, that is, each PDCCH schedules a corresponding transport block carried by the PDSCH.

In some embodiments, the terminal device may determine a PDCCH corresponding to the terminal device according to the used random preamble. That is to say, since the PDCCH has a corresponding relationship with the scheduled transport block carried by the PDSCH, the transport block carried by the PDSCH has a RAR, and the RAR is obtained by the base station based on different random access preambles, the terminal device can determine the PDCCH corresponding to the terminal device according to the random access preamble sent by itself to the base station.

It should be noted that, in order to enable the terminal device to understand that a PDCCH corresponding to the terminal device should be found from the plurality of PDCCHs sent by the base station, so as to reduce the monitoring time of the terminal device and reduce the power consumption of the terminal. In some embodiments of the present disclosure, control information carried by the plurality of different PDCCHs is respectively associated with different scrambling codes for scrambling. Among them, in some embodiments, the scrambling code associated with the control information carried by the PDCCH is related to the random access preamble corresponding to the RAR included in the correspondingly scheduled transport block carried by the PDSCH. For example, control information carried by a plurality of different PDCCHs may be scrambled respectively by using different RA-RNTIs, that is to say, control information carried by each PDCCH may be scrambled respectively by using different RA-RNTIs. The RA-RNTI used for control information carried by each PDCCH may be determined based on information of a random access preamble corresponding to a random access response. In this way, the terminal may determine a target PDCCH that needs to be detected according to the random access preamble sent by itself.

In some embodiments of the present disclosure, the plurality of different PDCCHs may use different transmission resources respectively. Among them, in some embodiments, the transmission resource used by each PDCCH is related to the random access preamble corresponding to the random access response included in the PDSCH. For example, a plurality of different PDCCHs may be transmitted on different transmission resources, for example, may be transmitted in different control resource sets, and the transmission resource is determined according to the selected preamble of the terminal device. The terminal device determines a corresponding transmission resource of the PDCCH according to the used preamble, and monitors the target PDCCH on the corresponding transmission resource.

For example, it is assumed that the number of random access preambles is 8 (i.e., assuming that the base station receives eight random access preambles), the number of transport blocks carried by the PDSCHs is 4, the index values of the eight random access preambles are respectively 32, 33, 34, 35, 36, 37, 38 and 39, and eight random access responses (RAR) corresponding to the eight random access preambles are RAR 1, RAR 2, RAR 3, RAR 4, RAR 5, RAR 6, RAR 7, and RAR 8, respectively. The base station receives the eight random access preambles, and may perform a modulo operation by using the index values of the eight random access preambles and the number (the numerical value being 4) of the transport blocks carried by the PDSCHs respectively. The obtained operation results are: 0, 1, 2, 3, 0, 1, 2 and 3, respectively and successively. Each numerical value in the operation results is respectively added with 1 to sum up, so as obtain a transport block identification.

As shown in FIG. 9, the random access response RAR 1 can be placed in the transport block TB #1 corresponding to the transport block number 1, the random access response RAR 2 can be placed in the transport block TB #2 corresponding to the transport block number 2, the random access response RAR 3 can be placed in the transport block TB #3 corresponding to the transport block number 3, the random access response RAR 4 can be placed in the transport block TB #4 corresponding to the transport block number 4, the random access response RAR 5 can be placed in the transport block TB #1 corresponding to the transport block number 1, the random access response RAR 6 can be placed in the transport block TB #2 corresponding to the transport block number 2, the random access response RAR 7 can be placed in the transport block TB #3 corresponding to the transport block number 3, and the random access response RAR 8 can be placed in the transport block TB #4 corresponding to the transport block number 4. The base station schedules the four transport blocks carried by the PDSCHs through four different PDCCHs, where each PDCCH schedules a corresponding transport block carried by the PDSCH, and each transport block carried by the PDSCH includes two random access responses.

Among them, the four different PDCCHs may use different RA-RNTIs for scrambling, respectively. The RA-RNTI used by each PDCCH may be determined based on information of a random access preamble corresponding to a random access response. In this way, the terminal may determine the target PDCCH that needs to be detected according to the random access preamble sent by itself. In some embodiments, the four different PDCCHs may be transmitted on different transmission resources, for example, may be transmitted in different control resource sets, and the transmission resource is determined according to the selected preamble of the terminal device. The terminal device determines the corresponding transmission resource of the target PDCCH according to the used preamble, and monitors the target PDCCH on the corresponding transmission resource.

In step 1003, a random access response (RAR) corresponding to the random access preamble is received from a transport block carried by a PDSCH scheduled by the PDCCH.

In some embodiments of the present disclosure, a target transport block carrying the RAR may be obtained from a plurality of transport blocks carried by the PDSCHs scheduled by the PDCCH.

In some embodiments, the target transport block may be determined according to a preset algorithm, where the preset algorithm is related to the index value of the used random access preamble and/or the number of all transport blocks. Among them, the preset algorithm may be pre-defined in a communication protocol between the base station and the terminal device. The preset algorithm may be any algorithm, as long as the base station is enabled to distribute at least one random access response corresponding to at least one random access preamble in at least one transport block carried by the PDSCH according to the algorithm, and the terminal is enabled to identify the random access response (RAR) corresponding to the preamble sent by the terminal itself from the corresponding target transport block through the algorithm.

In some embodiments of the present disclosure, taking that the preset algorithm is related to the index value of the used random access preamble and the number of all transport blocks as an example, a modulo operation may be performed on a certain index value of the random access preamble and the number of all transport blocks to obtain an operation result, and the operation result is added with 1 to sum up, so as to obtain a position index value of a transport block carrying the RAR corresponding to the random access preamble, thus allocating the RAR to the corresponding transport block carried by the PDSCH.

For example, it is assumed that the number of random access preambles is 8 (i.e., assuming that the base station receives eight random access preambles), the number of all transport blocks is 4, the index values of the eight random access preambles are respectively 32, 33, 34, 35, 36, 37, 38 and 39, and the random access responses (RAR) corresponding to the eight random access preambles are RAR 1, RAR 2, RAR 3, RAR 4, RAR 5, RAR 6, RAR 7, and RAR 8, respectively. FIG. 6 shows the four transport blocks carried by the PDSCHs scheduled by the base station through a same PDCCH, i.e., transport block TB #1, transport block TB #2, transport block TB #3, and transport block TB #4. Among them, the transport block TB #1 includes the random access responses RAR 1 and an RAR 5, the transport block TB #2 includes the random access responses RAR 2 and an RAR 6, the transport block TB #3 includes the random access responses RAR 3 and an RAR 7, and the transport block TB #4 includes the random access responses RAR 4 and an RAR 8. Assuming that the PDCCH as shown in FIG. 6 is a target PDCCH corresponding to the terminal device, and the index value of the random access preamble sent by the terminal device is 38, the terminal device performs a modulo operation on the index value "38" of the random access preamble sent by itself and N (the value being 4), obtain in an operation result of 2, and adds 1 to the operation result to sum up, so as to obtain a transport block identification Y of 3. In this way, the target transport block corresponding to the transport block identification Y of 3 can be obtained from the four transport blocks carried by the PDSCHs scheduled by PDCCH according to the transport block identification Y of 3. That is, the transport block TB #3 is the target transport block including the random access response RAR 7 corresponding to the terminal device. The terminal device can identify the random access response RAR 7 corresponding to the random access preamble sent by the terminal device itself from the transport block TB #3. For example, in some embodiments, the terminal device may perform descrambling on each RAR in the transport block TB #3 through the RA-RNTI associated with the random access preamble of the terminal device to obtain the RAR belonging to the terminal device. Thus, by reducing the size of the transport block including the random access response corresponding to the terminal device, the monitoring time of the terminal device can be reduced, so that the power consumption of the terminal is reduced and the coverage enhancement effect is improved.

It should be noted that the above-mentioned preset algorithm is an example provided for the convenience of those skilled in the art to understand the embodiments of the present disclosure, and cannot be used as a specific limitation on the present disclosure. That is to say, the preset algorithm may further be another algorithm that enables the base station to distribute at least one random access response corresponding to at least one random access preamble in at least one transport block carried by a PDSCH according to the algorithm, and enables the terminal to identify the target transport block corresponding to the terminal itself from the corresponding target PDCCH through the algorithm.

In some embodiments of the present disclosure, the terminal device may further obtain scheduling information related to the target PDCCH. Among them, in some embodiments, the scheduling information may include, but is not limited to, the number of transport blocks carried by the PDSCHs scheduled by the target PDCCH, and/or the number of random access responses included in each transport block carried by the PDSCH.

In some embodiments, the terminal device may receive from the control information of the PDCCH: the number of all transport blocks carried by the PDSCHs, and/or the number of RAR included in each transport block carried by the PDSCH. The specific content received by the terminal device from the control information of the PDCCH may be determined by the specific content of the control information sent by the base station on the PDCCH. For example, when the control information sent by the base station on the PDCCH includes the number of all transport blocks carried by the PDSCH, the terminal device may receive the number of all transport block carried by the PDSCH from the control information of the PDCCH. When the terminal device obtains the number of all transport blocks carried by the PDSCHs, the terminal device may determine the transport block carried by the PDSCH where the RAR corresponding to the random access preamble used by the terminal device is located according to the number of all transport blocks carried by the PDSCHs in combination with a preset algorithm, so that the terminal device is enabled to find the corresponding RAR from the transport block.

For another example, when the control information sent by the base station on the PDCCH includes the number of RARs included in each transport block carried by the PDSCH, the terminal device may receive the number of RARs included in each transport block carried by the PDSCH from the control information of the PDCCH. When the terminal device obtains the number of RARs included in each transport block carried by the PDSCH, the terminal device may determine the transport block carried by the PDSCH where the RAR corresponding to the random access preamble used by the terminal device is located according to the number of RARs included in each transport block carried by the PDSCH, so that the terminal device is enabled to find the corresponding RAR from the transport block.

For another example, when the control information sent by the base station on the PDCCH includes the number of all transport blocks carried by the PDSCHs and the number of RARs included in each transport block carried by the PDSCH, the terminal device may receive the number of all transport blocks carried by the PDSCHs and the number of RARs included in each transport block carried by the PDSCH from the control information of the PDCCH. When the terminal device obtains the number of all transport blocks carried by the PDSCHs and the number of RARs included in each transport block carried by the PDSCH, the terminal device may determine the transport block carried by the PDSCH where the RAR corresponding to the random access preamble used by the terminal device is located according to the number of all transport blocks carried by the PDSCHs and the number of RARs included in each transport block carried by the PDSCH, so that the terminal device is enabled to find the corresponding RAR from the transport block.

In some embodiments, the terminal device may receive, from the broadcast signaling sent by the base station, the number of all transport blocks carried by the PDSCHs, and/or the number of RARs included in each transport block carried by the PDSCH. The specific content received by the terminal device from the broadcast signaling sent by the base station may be determined according to the specific content of the broadcast signaling sent by the base station. For example, when the base station notifies the number of all transport blocks carried by the PDSCHs through the broadcast signaling, the terminal device may receive the number of all transport blocks carried by the PDSCHs from the broadcast signaling sent by the base station.

For another example, when the base station notifies the number of RARs included in each transport block carried by the PDSCH through the broadcast signaling, the terminal device may receive the number of RARs included in each transport block carried by the PDSCH from the broadcast signaling sent by the base station.

For another example, when the base station notifies the number of all transport blocks carried by the PDSCHs and the number of RARs included in each transport block carried by the PDSCH through the broadcast signaling, the terminal device may receive the number of all transport blocks carried by the PDSCHs and the number of RARs included in each transport block carried by the PDSCH from the broadcast signaling sent by the base station.

In summary, according to the method for receiving a random access response in the embodiments of the present disclosure, the terminal device sends the random access preamble to the base station, where the base station receives different random access preambles on a same time-frequency resource, and allocates the random access responses (RAR) respectively corresponding to the different random access preambles to different transport blocks. Among them, each transport block is carried by a PDSCH. In this way, the terminal device side determines the target transport block including the random access response (RAR) corresponding to itself from the corresponding transport block carried by the PDSCH, and determines the random access response (RAR) corresponding to the random access preamble sent by itself from the target transport block. Thus, by allocating different random access responses (RAR) to different transport blocks on the base station side, the size of the transport block transmitted by the base station to the terminal side is reduced, and the monitoring time of each terminal is reduced, so that the power consumption of the terminal can be reduced, and the coverage enhancement effect is improved.

Corresponding to the method for sending a random access response provided in the foregoing embodiments, the present disclosure further provides an apparatus for sending a random access response. Since the apparatus for sending a random access response provided in the embodiments of the present disclosure corresponds to the method for sending a random access response provided in the foregoing embodiments, the implementations of the method for sending a random access response are also applicable to the apparatus for sending a random access response provided in the embodiment, and are not described in detail in one embodiment.

Figure 11:
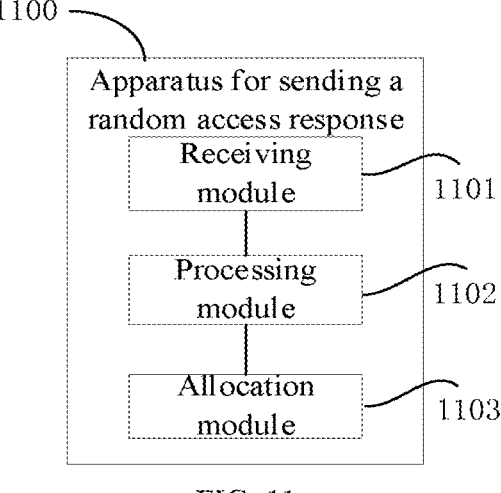
FIG. 11 is a schematic structural diagram of an apparatus for sending a random access response provided according to some embodiments of the present disclosure.

FIG. 11 is a schematic structural diagram of an apparatus for sending a random access response provided according to the present disclosure. Among them, the apparatus for sending a random access response may be applied to a base station. As shown in FIG. 11, the apparatus 1100 for sending a random access response may include a receiving module 1101, a processing module 1102, and an allocation module 1103.

In some embodiments, the receiving module 1101 is configured to receive at least one random access preamble.

The processing module 1102 is configured to generate at least one random access response (RAR) in response to the received at least one random access preamble.

The allocation module 1103 is configured to allocate the at least one RAR to at least one transport block carried by a physical downlink shared channel (PDSCH).

With regard to the apparatus in the above embodiment, the specific manner in which each module performs an operation has been described in detail in the embodiments related to the method, and will not be described in detail here.

In summary, according to the apparatus for sending a random access response in the embodiments of the present disclosure, by allocating different random access responses (RAR) to different transport blocks on the base station side, the size of the transport block transmitted by the base station to the terminal side is reduced, and the monitoring time of each terminal is reduced, so that the power consumption of the terminal can be reduced, and the coverage enhancement effect is improved.

Figure 12:
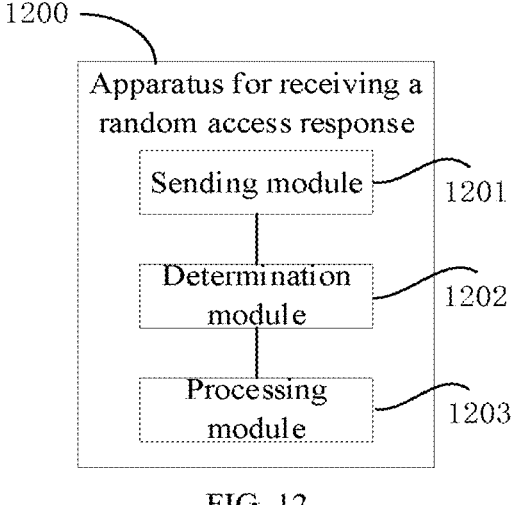
FIG. 12 is a schematic structural diagram of an apparatus for receiving a random access response provided according to some embodiments of the present disclosure.

Corresponding to the method for receiving a random access response provided in the foregoing embodiments, the present disclosure further provides an apparatus for receiving a random access response. Since the apparatus for receiving a random access response provided in the embodiment of the present disclosure corresponds to the method for receiving a random access response provided in the foregoing embodiments, implementations of the method for receiving a random access response are also applicable to the apparatus for receiving a random access response provided in the embodiment, and are not described in detail in one embodiment. FIG. 12 is a schematic structural diagram of an apparatus for receiving a random access response provided according to the present disclosure. Among them, the apparatus for receiving a random access response may be applied to a terminal device. As shown in FIG. 12, the apparatus 1200 for receiving a random access response may include a sending module 1201, a determination module 1202, and a processing module 1203.

In some embodiments, the sending module 1201 is configured to send a random access preamble to a base station.

The determination module 1202 is configured to determine a PDCCH.

The processing module 1203 is configured to receive a random access response (RAR) corresponding to the random access preamble from a transport block carried by a PDSCH scheduled by the PDCCH.

In summary, according to apparatus for receiving a random access response in the embodiments of the present disclosure, by allocating different random access responses (RAR) to different transport blocks on the base station side, the size of the transport block transmitted by the base station to the terminal side is reduced, and the monitoring time of each terminal is reduced, so that the power consumption of the terminal can be reduced, and the coverage enhancement effect is improved.

According to some embodiments of the present disclosure, the present disclosure further provides a base station. Among them, the base station may include a plurality of cells that provide services for the terminal. According to different specific application occasions, the base station may also be referred to as an access point, or may be referred to as a device in an access network that communicates with a wireless terminal device through one or more sectors on an air interface, or other names. The base station may be used to replace the received air frame with the Internet Protocol (IP) in group to serve as a router between the wireless terminal device and the remaining portion of the access network, where the remaining portion of the access network may include an Internet Protocol (IP) communication network. The base station may also coordinate attribute management of the air interface. For example, the base station involved in the embodiments of the present disclosure may be a network device (Base Transceiver Station, BTS) in a Global System for Mobile Communications (GSM) or a Code Division Multiple Access (CDMA), or may be a network device (NodeB) in a Wide-Band Code Division Multiple Access (WCDMA), or may also be an evolutional network device (evolutional Node B, eNB or e-NodeB) in a long term evolution (LTE) system, or a 5G base station (gNB) in a 5G network architecture (next generation system), or may be a home evolved base station (Home Evolved Node B, eNB), a relay node, a home base station (femto), a pico base station (pico), etc., which is not limited in the embodiments of the present disclosure. In some network structures, the base station may include a centralized unit (CU) node and a distributed unit (DU) node, and the centralized unit and the distributed unit may also be geographically separated.

It should be noted that the base station in the embodiments of the present disclosure may include a processor, a transceiver, a memory, and a computer program stored on the memory, and the processor runs the computer program to implement the method for sending a random access response according to any one of the foregoing embodiments.

In some embodiments, the memory in the base station is a non-transitory computer-readable storage medium provided by the present disclosure. Among them, the memory stores with instructions executable by at least one processor, so that the at least one processor executes the method for sending a random access response provided by the present disclosure. The non-transitory computer-readable storage medium of the present disclosure stores computer instructions that are configured to enable a computer to execute the method for sending a random access response provided by the present disclosure.

The memory, as a non-transitory computer-readable storage medium, may be configured to store a non-transitory software program, a non-transitory computer-executable program, and a module, for example, a program instruction/module corresponding to a method for sending a random access response in the embodiments of the present disclosure. The processor executes various functional applications and data processing of the server by running the non-transitory software program, the instruction, and the module stored in the memory, i.e., implementing the method for sending a random access response in the foregoing method embodiments.

The memory may include a program storage region and a data storage region, where the program storage region may store an operating system and at least one application program required by functions; and the data storage region may store data created according to the use of the positioned terminal device, etc. In addition, the memory may include a high-speed random access memory, and may further include a non-transitory memory, such as at least one magnetic disk storage device, a flash memory device, or other non-transitory solid-state memory devices. In some embodiments, the memory may include a memory remotely disposed relative to the processor, and the remote memory may be connected to the positioned terminal device through a network. Examples of the above network include, but are not limited to, the Internet, an enterprise intranet, a local area network, a mobile communication network, and a combination of them.

According to some embodiments of the present disclosure, the present disclosure further provides a terminal device and a readable storage medium.

Figure 13:
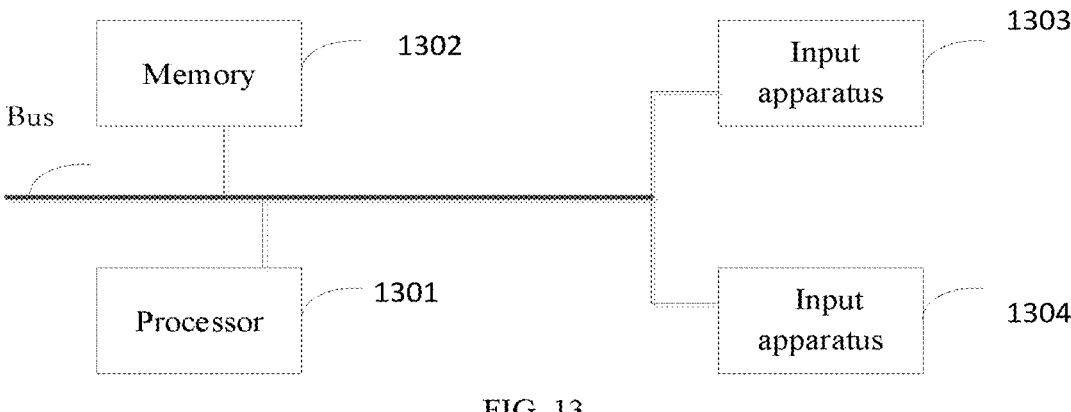
FIG. 13 is a block diagram of a terminal device for implementing a method for receiving a random access response according to some embodiments of the present disclosure.

FIG. 13 is a block diagram of a terminal device for implementing a method for receiving a random access response according to some embodiments of the present disclosure. The terminal device is intended to represent various forms of digital computers, such as laptop computers, desktop computers, workbenches, personal digital assistants, servers, blade servers, large computers, and other suitable computers. The terminal device may also represent various forms of mobile apparatuses, such as personal digital processing, cellular telephones, smart phones, wearable devices, and other similar computing apparatuses. The components, their connections and relationships, and their functions shown here are examples, and are not intended to limit the implementation of the present disclosure described and/or claimed here.

As shown in FIG. 13, the terminal device includes: one or more processors 1301, a memory 1302, and interfaces for connecting the various components, including a high-speed interface and a low-speed interface. The various components are connected to each other by using different buses, and may be installed on a common mainboard or installed in other ways as needed. The processor may process instructions executed within the terminal device, including instructions stored in or on the memory to display graphical information of the GUI on an external input/output apparatus, such as a display device coupled to the interface. In some embodiments, if needed, a plurality of processors and/or a plurality of buses may be used together with a plurality of memories and a plurality of memories. Likewise, a plurality of terminal devices may be connected, each device providing a portion of the necessary operations (e.g., as a server array, a set of blade servers, or a multi-processor system). In FIG. 13, one processor 1301 is taken as an example.

The memory 1302 is the non-transitory computer-readable storage medium provided by the present disclosure. Among them, the memory stores with instructions executable by at least one processor, so that the at least one processor executes the method for receiving a random access response provided by the present disclosure. The non-transitory computer-readable storage medium of the present disclosure stores computer instructions that is configured to enable a computer to execute the method for receiving a random access response provided by the present disclosure.

The memory 1302, as a non-transitory computer-readable storage medium, may be configured to store a non-transitory software program, a non-transitory computer-executable program, and a module, for example, a program instruction/module corresponding to the method for receiving a random access response in the embodiments of the present disclosure. The processor 1301 executes various functional applications and data processing of the server by running the non-transitory software program, the instruction, and the module stored in the memory 1302, i.e., implementing the method for receiving a random access response in the foregoing method embodiments.

The memory 1302 may include a program storage region and a data storage region, where the program storage region may store an operating system and at least one application program required by functions; and the data storage region may store data created according to the use of the positioned terminal device, etc. In addition, the memory 1302 may include a high-speed random access memory, and may further include a non-transitory memory, such as at least one magnetic disk storage device, a flash memory device, or other non-transitory solid-state memory devices. In some embodiments, the memory 1302 may include a memory remotely disposed relative to the processor, and the remote memory may be connected to the positioned terminal device through a network. Examples of the above network include, but are not limited to, the Internet, an enterprise intranet, a local area network, a mobile communication network, and a combination of them.

The terminal device executing the method for receiving a random access response may further include an input apparatus 1303 and an output apparatus 1304. The processor 1301, the memory 1302, the input apparatus 1303, and the output apparatus 1304 may be connected through a bus or in other manners. In FIG. 13, being connected through a bus is taken as an example.

The input apparatus 1303 may receive input digital or character information, and generate a key signal input related to user setting and function control of the positioned terminal device, such as a touch screen, a keypad, a mouse, a track board, a touchpad, an indicator rod, one or more mouse buttons, a trackball, a joystick and other input apparatuses. The output apparatus 1304 may include a display device, an auxiliary lighting device (e.g., an LED), a haptic feedback device (e.g., a vibration motor), or the like. The display device may include, but is not limited to, a liquid crystal display (LCD), a light emitting diode (LED) display, and a plasma display. In some embodiments, the display device may be a touch screen.

Various embodiments of the systems and techniques described here may be implemented in a digital electronic circuitry system, an integrated circuit system, a specific ASIC (Application Specific Integrated Circuit), a computer hardware, a firmware, a software, and/or combinations of them. These various embodiments may include being implemented in one or more computer programs that may be executed and/or interpreted on a programmable system including at least one programmable processor. The programmable processor may be a specific or general programmable processor that may receive data and instructions from a storage system, at least one input apparatus, and at least one output apparatus, and transmit the data and the instructions to the storage system, the at least one input apparatus, and the at least one output apparatus.

These computing programs (also referred to as programs, software, software applications, or code) include machine instructions of a programmable processor, and these computing programs may be implemented using advanced process and/or object-oriented programming languages, and/or assembler/machine languages. As used here, the terms "machine-readable medium" and "computer-readable medium" refer to any computer program product, device, and/or apparatus (e.g., magnetic disk, optical disk, memory, programmable logic device (PLD)) for providing machine instructions and/or data to the programmable processor, including a machine-readable medium that receives machine instructions as machine-readable signals. The term "machine-readable signal" refers to any signal used to provide machine instructions and/or data to the programmable processor.

To provide interaction with a user, the systems and techniques described here may be implemented on a computer having a display apparatus such as a CRT (Cathode Ray Tube) or an LCD (liquid crystal display) monitor for displaying information to the user, and a keyboard and a pointing apparatus (such as a mouse or trackball) through which the user may provide input to the computer. Other types of apparatuses may also be used to provide interaction with the user. For example, feedback provided to the user may be any form of sensory feedback (such as visual feedback, auditory feedback, or haptic feedback); and input from the user may be received in any form, including acoustic input, voice input, or haptic input.

The systems and techniques described here may be implemented in a computing system including a background component (e.g., as a data server), or a computing system including a middleware component (e.g., an application server), or a computing system including a front-end component (e.g., a user computer with a graphical user interface or a web browser, through which the user may interact with implementations of the systems and techniques described here), or a computing system including any combination of such background components, middleware components, or front-end components. The components of the system may be interconnected by digital data communication in any form or medium (e.g., a communication network). Examples of communications networks include a local area network (LAN), a wide area network (WAN), and the Internet.

The computer system may include a client and a server. The client and the server are generally remote from each other and typically interact with each other through a communication network. The relationship between the client and the server is generated by running computer programs having a client-server relationship to each other on respective computers.

It should be understood that the various forms of processes shown above may be used to reorder, add steps, or delete steps. For example, the various steps described in the present disclosure may be executed in parallel, in sequence, or in a different order, as long as the results expected by the technical solutions disclosed in the present disclosure can be implemented, which is not limited here.

The foregoing specific implementations do not constitute a limitation on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure should be included within the protection scope of the present disclosure.

What is claimed is:

1. A method for sending a random access response, wherein the method is applied to a base station, and the method comprises:
 generating at least one random access response (RAR) in response to receiving at least one random access preamble; and
 allocating the at least one RAR to at least one transport block carried by at least one physical downlink shared channel (PDSCH) according to a preset algorithm, wherein the preset algorithm is related to an index value in the at least one random access preamble, and/or a number of all transport blocks.

2. The method according to claim 1, wherein the at least one transport block carried by the at least one PDSCH comprises a plurality of transport blocks;
 a set capacity size of each transport block of the plurality of transport blocks is equal to a set capacity size of other ones of the plurality of transport blocks; or
 a set capacity size of each transport block of the plurality of transport blocks is different from a set capacity size of other ones of the plurality of transport blocks.

3. The method according to claim 2, further comprising:
 performing, in response to an information size of the at least one RAR allocated in a transport block carried by a PDSCH being lower than the set capacity size of the transport block carried by the PDSCH, information filling and padding on the transport block carried by the PDSCH until reaching the set capacity size.

4. The method according to claim 1, wherein allocating the at least one RAR to the at least one transport block carried by the at least one PDSCH according to the preset algorithm comprises:
 obtaining an operation result by performing a modulo operation on the index value of a random access preamble for the number of all transport blocks; and obtaining a position index value of a transport block carrying a RAR corresponding to the random access preamble by adding 1 to the operation result.

5. The method according to claim 1, further comprising:
 scheduling the at least one transport block carried by the at least one PDSCH through a physical downlink control channel (PDCCH);
 wherein scheduling the at least one transport block carried by the at least one PDSCH through the PDCCH comprises:
 scheduling all transport blocks carried by PDSCHs in the at least one transport block carried by the at least one PDSCH through a same PDCCH.

6. The method according to claim 5, wherein
 a plurality of transport blocks carried by PDSCHs share a part of scheduling resources;
 control information sent on the PDCCH comprises an MCS or a transmission resource associated with the plurality of transport blocks carried by PDSCHs; and
 the plurality of transport blocks carried by PDSCHs are continuous in time, or provided with a time interval between each other.

7. The method according to claim 5, wherein control information sent on the PDCCH comprises:
 a number of all transport blocks carried by PDSCHs; and/or
 a number of RARs comprised in each transport block carried by a PDSCH.

8. The method according to claim 5, wherein following are notified through broadcast signaling:
 a number of all transport blocks carried by PDSCHs; and/or
 a number of RARs comprised in each transport block carried by a PDSCH.

9. The method according to claim 5, wherein scheduling the at least one transport block carried by the at least one PDSCH through the PDCCH comprises:
 scheduling different transport blocks carried by PDSCHs respectively through a plurality of different PDCCHs;
 wherein the plurality of different PDCCHs have a corresponding relationship with scheduled transport blocks carried by PDSCHs.

10. The method according to claim 9, further comprising:
 performing scrambling by associating control information carried by the plurality of different PDCCHs with different scrambling codes respectively;
 wherein a scrambling code associated with control information carried by a PDCCH is related to a random access preamble corresponding to a RAR comprised in a correspondingly scheduled transport block carried by a PDSCH.

11. The method according to claim 9, wherein
 the plurality of different PDCCHs respectively use different transmission resources; and
 a transmission resource used by a PDCCH is related to a random access preamble corresponding to a RAR comprised in a correspondingly scheduled transport block carried by a PDSCH.

12. A method for receiving a random access response, wherein the method is applied to a terminal device, and the method comprises:
 sending a random access preamble to a base station;
 determining a physical downlink control channel (PDCCH); and
 receiving a random access response (RAR) corresponding to the random access preamble from a transport block carried by a physical downlink shared channel (PDSCH) scheduled by the PDCCH, wherein the RAR is allocated to a transport block carried by the PDSCH according to a preset algorithm, and the preset algorithm is related to an index value in the random access preamble, and/or a number of all transport blocks.

13. The method according to claim 12, wherein receiving the RAR from the transport block carried by the PDSCH scheduled by the PDCCH comprises:

obtaining a transport block carrying the RAR from a plurality of transport blocks carried by PDSCHs scheduled by the PDCCH.

14. The method according to claim 13, further comprising:

determining the transport block carrying the RAR according to the preset algorithm.

15. The method according to claim 12, wherein determining the PDCCH comprises:

determining the PDCCH according to a used random access preamble.

16. The method according to claim 15, wherein determining the PDCCH according to the used random access preamble comprises:

determining a scrambling code associated with control information carried by the PDCCH according to the used random access preamble; and detecting the PDCCH according to the scrambling code.

17. The method according to claim 15, wherein determining the corresponding PDCCH according to the used random access preamble comprises:

determining a transmission resource used by the PDCCH according to the used random access preamble; and monitoring the PDCCH on the transmission resource.

18. A base station, comprising a processor, a transceiver, a memory, and a computer program stored in the memory, wherein the processor is configured to execute the computer program to cause the base station to:

generate at least one random access response (RAR) in response to receiving at least one random access preamble; and allocate the at least one RAR to at least one transport block carried by at least one physical downlink shared channel (PDSCH) according to a preset algorithm, wherein the preset algorithm is related to an index value in the at least one random access preamble, and/or a number of all transport blocks.

19. A terminal device, comprising a processor, a transceiver, a memory, and a computer program stored in the memory, wherein the processor is configured to execute the computer program to implement the method for receiving a random access response according to claim 12.

\* \* \* \* \*